United States Patent Office 3,560,508
Patented Feb. 2, 1971

3,560,508
PROCESS FOR THE PRODUCTION OF 5,7-DI-CHLORO-8-HYDROXY-QUINOLINE AND 5,7-DICHLORO-8-HYDROXY-QUINALDINE
Karl Ruhl, Castrop-Rauxel, and Georg Grigoleit and Ludwig Rappen, Duisburg-Meiderich, Germany, assignors to Rutgerswerke und Teerverwertung Aktiengesellschaft, Frankfurt-am-Main, Germany
Frankfurt-am-Main, Germany
No Drawing. Filed Feb. 20, 1968, Ser. No. 706,759
Int. Cl. C07d 33/44
U.S. Cl. 260—289
6 Claims

ABSTRACT OF THE DISCLOSURE 5,7 - dichloro - 8 - hydroxy-quinoline or 5,7-dichloro-8-hydroxy-quinaldine is produced by chlorinating a solution in chloroform of the starting material 8-hydroxy-quinoline or 8-hydroxy-quinaldine with an excess of chlorine in the presence in the solution of 0.5 to 5% by weight of iodine, based on the weight of the starting compound. After chlorination, the solvent is removed from the reaction mixture by distillation with the addition of water and the chlorinated product is precipitated and filtered off. The yield amounts e.g. to about 94–97% of the theory.

---

This invention is concerned with improvements in and relating to the production of 5,7-dichloro-8-hydroxy-quinoline and 5,7-dichloro-8-hydroxy-quinaldine. It has been proposed to produce 5,7-dichloro-8-hydroxy-quinoline by chlorinating 8-hydroxy-quinoline with chlorine in glacial acetic acid with cooling. When the chlorination is terminated, 53% of the acetic acid is distilled off and the residue then taken up in water in order to precipitate the 5,7-dichloro-8-hydroxy-quinoline. The disadvantage of this method is that 47% of the acetic acid used is lost and/or has to be recovered by an expensive distillation process. Further, if a pure product is required, recrystallization is necessary.

According to another proposed method, the chlorination of 8-hydroxyquinoline in glacial acetic acid is carried out in the presence of antimony trichloride as catalyst. This process leads to contamination with the catalysts which will form metal complexes with the 8-hydroxy-quinoline and/or the 5,7-dichloro-8-hydroxyquinoline.

It is the main object of this invention to provide an improved process for the production of 5,7-dichloro-8-hydroxyquinoline and 5,7-dichloro-8-hydroxyquinaldine in increased yields and to avoid the expensive and troublesome purification necessary in the prior processes.

According to the invention there is provided a process for the production of 5,7-dichloro-8-hydroxy-quinoline or 5,7-dichloro-8-hydroxy-quinaldine which comprises chlorinating a solution of 8-hydroxy-quinoline or 8-hydroxy-quinaldine in chloroform with an excess of chlorine in the presence of 0.5–5% by weight of iodine, based on the weight of 8-hydroxy-quinoline or 8-hydroxy-quinaldine used as starting material. After chlorination is ended, the solvent is removed from the reaction mixture by distillation with the addition of water.

In a preferred embodiment of the process of the invention, 8-hydroxy-quinoline or 8-hydroxy-quinaldine and 0.5–5% by weight of iodine, based on the weight of 8-hydroxy-quinoline or 8-hydroxy-quinaldine, are dissolved in chloroform. Whilst maintaining a temperature of between 20–30° C., about 3 moles of chlorine per mole of 8-hydroxy-quinoline or 8-hydroxy-quinaldine are introduced into the solution. The excess of chlorine is required to obtain a high yield, as the intermediate 5,7,7-trichloro-8-ketoquinoline or -quinaldine will be formed in all probability. When the supply of chlorine is stopped, the solution is stirred for about 5 hours at about 20° C. and, subsequently, as much sodium pyrosulphite is added as is needed to prevent potassium iodide starch paper from turning blue, i.e. sufficient to destroy substantially all the chlorine in the reaction mixture. When adding the pyrosulphite, the temperature should be kept below 55° C. Afterwards, the chloroform is distilled off with the addition of water and the reaction solution is adjusted to a pH of about 2 by the addition of ammonium hydroxide solution, in order to precipitate the 5,7-dichloro-8-hydroxy-quinoline or 5,7-dichloro-8-hydroxy-quinaldine. The precipitate is then filtered off hot and is washed with a dilute, e.g. about 3% sodium bisulphite solution and water in order to remove traces of iodine.

In order that the invention may be well understood, the following examples are given by way of illustration only.

EXAMPLE 1

In a 2 litre flask, 125 grams of 8-hydroxy-quinoline are dissolved in 1,000 ml. of chloroform and 1.5 grams of iodine are added to the solution. Subsequently, 200 grams of chlorine are introduced into the reaction mixture over a period of 3 hours at 25° C. and the mixture is then stirred for 5 hours. Subsequently, 90 grams of sodium pyrosulphite, dissolved in 350 ml. of water, are added so that a reaction temperature of 55° C. is not exceeded. The chloroform is then distilled off whilst 250 ml. of water are added dropwise. 750 ml. of water are again stirred into the clear solution so that a temperature of between 40 and 50° C. is maintained. The reaction mixture is then adjusted to pH 2 with ammonia and is then filtered hot. The residue on the filter, consisting of 5,7-dichloro-8-hydroxy-quinoline, is washed with a 3% sodium bisulphite solution and water.

Yield: 181 grams=97% of the theory. Melting point= 178–179° C.

EXAMPLE 2

In a 2 litre flask, 100 grams of 8-hydroxy-quinaldine and 2 grams of iodine are dissolved in 1,000 ml. of chloroform. Into this solution, 100 grams of chlorine are introduced over a period of 3 hours at a temperature of 25° C. with stirring. After stirring for a further 5 hours, a solution of 75 grams sodium pyrosulphite in 250 ml. of water is added dropwise. During this period, the temperature is not allowed to exceed 45° C. Afterwards, the chloroform is distilled off whilst 1,000 ml. of water are simultaneously added dropwise. A further 500 ml. of water are then added to the reaction mixture, which is then adjusted to pH 2 with ammonia and filtered hot. The residue on the filter consisting of 5,7-dichloro-8-hydroxy-quinaldine is washed with an aqueous 3% sodium bisulphite solution and water.

Yield: 135 grams=94% of the theory. Melting point= 109–110° C.

It will be understood that the present invention is not limited to the specific conditions, proportions and the like, specifically stated above, and can be carried out with various modifications without departing from the scope and spirit of the invention. Thus, the iodine catalyst can be used in any proportion within the above stated range of 0.5–5% by weight. The amount of chlorine introduced into the reaction mixture may vary for example within 3 to 5 mols for one mol of the compound to be chlorinated. When distilling off the chloroform from the reaction mixture with the addition of water, as described above, the amount of water added dropwise, may vary in the range of 100 to 1000 ml., if initially 1000 ml. of chloroform were used. Said distillation of the chloroform with addition of water, may be carried out under ordinary atmospheric pressure or under a moderate vacuum, e.g. 400 to 600 torr.

The parts and percent stated herein are by weight, if not otherwise stated.

What is claimed is:

1. A process for the production of a compound selected from the group consisting of 5,7-dichloro-8-hydroxy-quinoline and 5,7-dichloro-8-hydroxy-quinaldine, which comprises chlorinating a solution of said compound in chloroform with a molar excess of 3 mols of chlorine to 1 mol of the compound to be chlorinated, at a temperature of from 20 to 30° C., in the presence in said solution of 0.5–5% by weight of iodine, based on the weight of said compound present in said solution.

2. A process as claimed in claim 1, in which after the end of chlorination the chloroform is distilled from the solution by distillation with the addition of water to said solution.

3. A process as claimed in claim 1, in which chlorination is effected by introducing the chlorine into the solution at a temperature of from 20 to 30° C. and after introduction of chlorine is complete, maintaining the solution at a temperature of about 20° C. for about 5 hours.

4. A process as claimed in claim 1, wherein, after chlorination, excess chlorine is removed by addition to the reaction solution of a sodium pyrosulphite solution, the temperature of the solution being maintained below 55° C.

5. A process as claimed in claim 2, wherein the chlorinated compound is precipitated from solution by the addition of ammonium hydroxide solution up to a pH of about 2 of the solution containing the chlorinated compound.

6. A process as claimed in claim 5, in which the precipitate is filtered in the hot and washed with water and dilute sodium bisulfite solution.

References Cited

UNITED STATES PATENTS

| 2,411,670 | 11/1946 | Senn | 260—289 |
| 2,740,810 | 4/1956 | Skeeters | 260—694X |
| 2,766,279 | 10/1956 | Jenny | 260—694X |
| 3,123,608 | 3/1964 | Mathes | 260—694X |
| 3,136,768 | 6/1964 | Grids | 260—287 |

OTHER REFERENCES

Fieser et al., Adv. Org. Chem., Reinhold, 1961, p. 774 relied on.

DONALD G. DAUS, Primary Examiner

U.S. Cl. X.R.

260—694